US011162222B2

(12) United States Patent
Land Hensdal et al.

(10) Patent No.: US 11,162,222 B2
(45) Date of Patent: Nov. 2, 2021

(54) BARRIER FILM COMPRISING MICROFIBRILLATED CELLULOSE AND MICROFIBRILLATED DIALDEHYDE CELLULOSE AND A METHOD FOR MANUFACTURING THE BARRIER FILM

(71) Applicant: Stora Enso OYJ, Helsinki (FI)

(72) Inventors: Cecilia Land Hensdal, Forshaga (SE); Adrianna Svensson, Karlstad (SE); Liv Bergqvist, Skoghall (SE); Amy Tran Carlström, Västerås (SE); Lars Axrup, Hammarö (SE)

(73) Assignee: Stora Enso OYJ, Helsinki (FI)

( * ) Notice: Subject to any disclaimer, the term of this patent is extended or adjusted under 35 U.S.C. 154(b) by 129 days.

(21) Appl. No.: 16/604,489

(22) PCT Filed: Apr. 11, 2018

(86) PCT No.: PCT/IB2018/052543
§ 371 (c)(1),
(2) Date: Oct. 10, 2019

(87) PCT Pub. No.: WO2018/189698
PCT Pub. Date: Oct. 18, 2018

(65) Prior Publication Data
US 2020/0086604 A1 Mar. 19, 2020

(30) Foreign Application Priority Data

Apr. 12, 2017 (SE) .................................. 1750437-4

(51) Int. Cl.
| | | |
|---|---|---|
| *B32B 5/06* | (2006.01) | |
| *B32B 23/06* | (2006.01) | |
| *B32B 23/08* | (2006.01) | |
| *B32B 27/32* | (2006.01) | |
| *B32B 27/36* | (2006.01) | |
| *B32B 27/34* | (2006.01) | |
| *B32B 27/08* | (2006.01) | |
| *B32B 27/10* | (2006.01) | |
| *C08B 15/02* | (2006.01) | |
| *B82Y 30/00* | (2011.01) | |
| *C08L 1/02* | (2006.01) | |
| *C08J 5/18* | (2006.01) | |
| *D21H 19/34* | (2006.01) | |
| *D21H 27/10* | (2006.01) | |
| *D21H 11/18* | (2006.01) | |
| *D21H 27/30* | (2006.01) | |
| *D21H 11/20* | (2006.01) | |
| *B32B 23/04* | (2006.01) | |
| *B32B 27/30* | (2006.01) | |
| *C08J 7/048* | (2020.01) | |
| *C08J 7/052* | (2020.01) | |

(52) U.S. Cl.
CPC ............... *D21H 11/18* (2013.01); *B32B 5/06* (2013.01); *B32B 23/042* (2013.01); *B32B 23/06* (2013.01); *B32B 23/08* (2013.01); *B32B 27/306* (2013.01); *B32B 27/32* (2013.01); *B32B 27/36* (2013.01); *C08J 7/048* (2020.01); *C08J 7/052* (2020.01); *B32B 2307/7244* (2013.01); *B32B 2307/7246* (2013.01); *B32B 2439/00* (2013.01); *C08L 2201/14* (2013.01); *C08L 2203/16* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 2012/0094047 A1 | 4/2012 | Albertson et al. | |
| 2013/0017400 A1 | 1/2013 | Imai et al. | |
| 2016/0214357 A1* | 7/2016 | Larsson | ................. D21H 27/10 |
| 2018/0194863 A1* | 7/2018 | Larsson | ..................... C08J 5/18 |

FOREIGN PATENT DOCUMENTS

| | | |
|---|---|---|
| CN | 102821949 A | 12/2012 |
| EP | 2371892 | 10/2011 |
| EP | 2371893 | 10/2011 |
| EP | 2551104 | 1/2013 |
| EP | 2554589 | 2/2013 |
| JP | 2000303386 | 10/2000 |
| JP | 2002194691 | 7/2002 |
| JP | 2014196400 | 10/2014 |

(Continued)

OTHER PUBLICATIONS

International Searching Authority, Written Opinion of the International Searching Authority, PCT/IB2018/052543, dated Oct. 18, 2018.
International Searching Authority, International Search Report, PCT/IB2018/052543, dated Oct. 18, 2018.
Chinga-Carrasco, G., "Cellulose fibres, nanofibrils and microfibrils,: The morphological sequence of MFC components from a plant physiology and fibre technology point of view," Nanoscale research letters 2011, 6:417.
Fengel, D., "Ultrastructural behavior of cell wall polysaccharides," Tappi J., Mar. 1970, vol. 53, No. 3.
Lavoine, et al., "Microfibrillated Cellulose—Its Barrier Properties and Applications in Cellulosic Materials: A Review," Carbohydrate Polymers, 90 (2012), 735-764.

(Continued)

*Primary Examiner* — Sheeba Ahmed
(74) *Attorney, Agent, or Firm* — Greer, Burns & Crain, Ltd.

(57) ABSTRACT

The present invention relates to a method for manufacturing at least one layer of a film wherein the method comprises the steps of; providing a first suspension comprising microfibrillated cellulose, providing a second suspension comprising microfibrillated dialdehyde cellulose, mixing the first suspension with the second suspension to form a mixture, applying said mixture to a substrate to form a fibrous web and drying said web to form at least one layer of said film. The present invention further relates to a film comprising said at least one layer.

16 Claims, 3 Drawing Sheets

(56) References Cited

FOREIGN PATENT DOCUMENTS

| | | |
|---|---|---|
| JP | 2015024540 | 2/2015 |
| JP | 2016211116 A | 12/2016 |
| WO | 2015034426 | 3/2015 |
| WO | 2017046754 A1 | 3/2017 |

OTHER PUBLICATIONS

Kumar et al., "Comparison of Nano- and Microfibrillated Cellulose Films," Cellulose, 2014, 21, 3443-3456.

Zhao, H. and Heindel, N.D., "Determination of Degree of Substitution of Formyl Groups in Polyaldehyde Dexran by the Hydroxylamine Hydrochloride Method," Pharmaceutical Research, vol. 8, 1991, 400-402.

Sirviö, J. et al., "Dialdehyde Cellulose Microfibers Generated from Wood Pulp by Milling-Induced Periodate Oxidation," Carbohydrate Polymers, 2011, vol. 86, No. 1, 260-265.

Extended European Search Report for corresponding European application No. 18784404.8-1102, dated Dec. 17, 2020.

\* cited by examiner

BARRIER FILM COMPRISING MICROFIBRILLATED CELLULOSE AND MICROFIBRILLATED DIALDEHYDE CELLULOSE AND A METHOD FOR MANUFACTURING THE BARRIER FILM

This application is a U.S. National Phase under 35 U.S.C. § 371 of International Application No. PCT/IB2018/052543, filed Apr. 11, 2018, which claims priority under 35 U.S.C. §§ 119 and 365 to Swedish Application No. 1750437-4, filed Apr. 12, 2017.

TECHNICAL FIELD

The present invention relates to a barrier film having a good and stable oxygen transmission rate (OTR) at high relative humidities (RH). More particularly, the present invention relates to a method of manufacturing such a film and a film produced.

BACKGROUND

Today, films comprising microfibrillated cellulose (MFC), have proven to give excellent barrier properties (see e.g. Aulin et al., Oxygen and oil barrier properties of microfibrillated cellulose films and coatings, Cellulose (2010) 17:559-574, Lavoine et al., Microfibrillated cellulose—Its barrier properties and applications in cellulosic materials: A review, Carbohydrate polymers 90 (2012) 735-764, Kumar et al., Comparison of nano- and microfibrillated cellulose films, Cellulose (2014) 21:3443-3456), whereas the gas barrier properties are very dependent on the moisture or the relative humidity in the surrounding environment. Therefore, it is quite common that MFC films have to be coated with a polymer film to prevent moisture or water vapor to swell and disrupt the MFC film.

The lack of gas barrier properties such as oxygen or air, at high relative humidity has been investigated and described but most of the suggested solutions are expensive and difficult to implement in industrial scale. One route is to modify the MFC or nanocellulose such as disclosed in EP2554589A1 where MFC dispersion was modified with silane coupling agent. The EP2551104A1 teaches the use of MFC and polyvinyl alcohol (PVOH) and/or polyuronic acid with improved barrier properties at higher relative humidity (RH). Another solution is to coat the film with a film that has high water fastness and/or low water vapor transmission rate. The JP2000303386A discloses e.g. latex coated on MFC film, while US2012094047A teaches the use of wood hydrolysates mixed with polysaccharides such as MFC that can be coated with a polyolefin layer. In addition to this chemical modification, the possibility of cross-linking fibrils or fibrils and copolymers has been investigated. This improves water fastness of the films but also water vapor transmission rates. EP2371892A1, EP2371893A1, claims cross-linking MFC with metal ions, glyoxal, glutaraldehyde and/or citric acid, respectively.

Another way to decrease the moisture sensitivity of cellulose is to chemical modify the cellulose with sodium periodate to obtain dialdehyde cellulose (DAC). By fibrillating of dialdehyde cellulose a barrier film with improved moisture resistant can be produced. However, a dispersion comprising microfibrillated dialdehyde cellulose (DA-MFC) is very unstable since the DA-MFC sediments and is spontaneously crosslinking to certain degree already in the dispersion leading to that the microfibrils are bound or entangled. Also, the poor stability of the dispersion results in variations of the concentration of DA-MFC in the film leading to poor film formation and thus bad barrier properties.

There is thus a need to find a simple solution of producing films having good barrier properties even at high humidity.

SUMMARY

It is an object of the present invention, to provide an improved film comprising microfibrillated cellulose, which has improved barrier properties even at higher relative humidity in the surroundings.

It is an object of the present invention to provide an improved film comprising microfibrillated cellulose which is able to remain good barrier properties even if the humidity fluctuates.

The invention is defined by the appended independent claims. Embodiments are set forth in the appended dependent claims and in the following description and drawings.

The present invention relates to a method for manufacturing at least one layer of a film wherein the method comprises the steps of; providing a first suspension comprising a microfibrillated cellulose, providing a second suspension comprising microfibrillated dialdehyde cellulose, mixing the first suspension with the second suspension to form a mixture, applying said mixture to a substrate to form a fibrous web and drying said web to form at least one layer of said film. It has surprisingly been found that it is possible to produce a very stable suspension or mixture by mixing a first suspension comprising microfibrillated cellulose and a second suspension comprising microfibrillated dialdehyde cellulose. It is crucial that a suspension used for the production of barrier materials is stable since uneven distribution of the fibrils will lead to deteriorated barrier properties. Furthermore, it was found that the use of both microfibrillated cellulose of the first suspension and microfibrillated cellulose of the second suspension (DA-MFC) makes it possible to produce at least one layer of a film that gives the film improved barrier properties at high humidity, especially at fluctuating humidity.

The mixture preferably comprises between 20-95% by weight of microfibrillated dialdehyde cellulose based on the total fiber weight of the mixture. The mixture preferably comprises between 5-80% by weight of microfibrillated cellulose based on the total fiber weight of the mixture. Depending on the end use and the properties of the microfibrillated cellulose of the first suspension and the second suspension the amount of microfibrillated dialdehyde cellulose may vary.

The dry content of the mixture applied to the substrate is preferably between 1-10% by weight. Depending on the substrate onto which the mixture is applied the dry content of the mixture may vary.

The at least one layer of the film preferably has an oxygen transmission rate in the range of from 0.1 to 300 cc/m$^2$/24 h according to ASTM D-3985, at a relative humidity of 50% at 23° C. and/or at a relative humidity of 90% at 38° C. By the present invention it is possible to produce at least one layer of a film that has very good oxygen barrier properties at high humidity. It has especially been found that the film according to the present invention is more resistant towards fluctuations in humidity, i.e. the film still has good barrier properties even if the humidity varies.

The substrate is preferably a polymer or metal substrate. It is preferred that the mixture is cast coated onto said substrate.

The method may further comprise the step of pressing the film after drying. It has been shown that the barrier properties of the film is increased if the film is subjected to increased pressure after drying. The pressure applied in the pressing is preferably above 40 kN/m (over pressure), more preferably between 100-900 kN/m. The temperature is preferably increased to between 50-200° C., preferably between 100-150° C. during pressing of the film.

The mixture may further comprise additives, preferably any one of a starch, carboxymethyl cellulose, a filler, retention chemicals, flocculation additives, deflocculating additives, dry strength additives, softeners, or mixtures thereof. It may be possible to add additives that will improve different properties of the mixture and/or the produced film such as latex and/or polyvinyl alcohol for enhancing the ductility of the film. It may be possible to add the additive to the first suspension, the second suspension and/or to the mixture.

According to one aspect of the invention, the microfibrillated dialdehyde cellulose in the second suspension has an oxidation degree between 25-75%.

The present invention further relates to a film comprising microfibrillated cellulose wherein the film has an oxygen transmission rate in the range of from 0.1 to 300 cc/m²/24 h measure according to ASTM D-3985, at a relative humidity of 50% at 23° C. and/or at a relative humidity of 90% at 38° C., and wherein at least one layer of the film comprises a mixture of microfibrillated cellulose and microfibrillated dialdehyde cellulose.

The film preferably has a basis weight of less than 50 g/m², preferably between 10-50 g/m².

The film is preferably a multilayer film comprising more than one layer.

According to one aspect of the invention, at least one layer of the multilayer film comprises latex for enhancing the ductility of the film.

According to one aspect of the invention, at least one layer of the multilayer film is a water vapor barrier film comprising any one of polyethylene (PE), polypropylene (PP), polyamide, polyethylene terephthalate (PET) or ethylene vinyl alcohol (EVOH). The water vapor barrier film has preferably a grammage between 10-60 g/m², preferably 30-50 g/m². A layer of polyethylene (PE) on at least one side of the film comprising microfibrillated dialdehyde cellulose also improves strainability of the film and provides heat-sealing properties.

According to another aspect of the invention, at least one layer of the multilayer film is a metallized barrier layer. By "metallized barrier layer" means a thin layer of metal providing barrier properties reducing permeability to e.g. oxygen, water, water vapour and light. According to one aspect of the invention, said metallized barrier layer is a physical vapour deposited metal or metal oxide layer, or a chemical vapour deposited metal or metal oxide layer, wherein said metal or metal oxide is selected from the group consisting of aluminium, aluminium oxides, magnesium oxides, silicium oxides, copper, magnesium and silicon. Preferably, the metallized barrier layer has a weight between 50-250 mg/m², preferably between 75-150 mg/m². The present invention further relates to a packaging material comprising a base material laminated with at least one layer of the film previously described comprising a mixture of a microfibrillated cellulose and a microfibrillated dialdehyde cellulose. Said base material is preferably paper or paperboard. According to one aspect of the invention, the paper or paperboard of said packaging material has a grammage between 20-500 g/m², for instance between 80-400 g/m².

The packaging material may comprise a multilayer film which in addition to the film comprising a mixture of a microfibrillated cellulose and a microfibrillated dialdehyde cellulose also comprises one or more of a water vapor barrier layer and/or a metallized barrier layer previously described.

DESCRIPTION OF EMBODIMENTS

The method according to the present invention relates to providing a first suspension comprising microfibrillated cellulose and mixing said first suspension with a second suspension comprising microfibrillated dialdehyde cellulose (DA-MFC) to form a mixture. The mixture is then applied onto a substrate to form a fibrous web and said web is thereafter dried to form at least one layer of the film. It has surprisingly been found that by forming a mixture comprising microfibrillated cellulose and microfibrillated cellulose from dialdehyde cellulose (DA-MFC) a more stable mixture is achieved. This improves the handling and the ability of the mixture to form good barrier films. Furthermore, it was found that by using said mixture in the production of at least one layer of a film, a film with improved barrier properties at high humidity can be produced. Above all, it was surprisingly found that the film has very good resistance against fluctuating humidity. The barrier properties of the film was still good even if the humidity fluctuated from low, to high, to low and back to high.

The at least one layer of the film is produced by applying said mixture to a substrate to form a fibrous web and drying said web to form at least one layer of said film. The drying of said web may be done in any conventional way. The dry content of the at least one layer of the film after drying is preferably above 95% by weight.

The method may further comprise the step of pressing the film after drying. It has been shown that the barrier properties of the film is increased if the film is subjected to increased pressure after drying. The pressure used is preferably between 40-900 kPa and the pressing may last for a period of less than 10 minutes, preferably between 1 second to 10 minutes. It is preferred that the pressing is done at elevated temperatures. Temperatures used during pressing may be between 50-200° C., preferably between 100-150° C. The pressing may be done in any conventional equipment such as presses or calenders. By combining the use of pressing, preferably hot pressing of the formed film the barrier of the film is strongly increased.

The substrate may be a polymer or metal substrate to which the mixture is casted onto. The cast coated fibrous web can be dried in any conventional manner and thereafter optionally peeled off from the substrate. It may be possible to cast or coat more than one layer onto the substrate forming a multilayer film. It is possible to produce a film comprising more than one layer wherein at least one of the layers comprises the mixture according to the invention. It may also be possible that more than one layer of the film comprises the mixture according to the invention. It may also be possible that one or more layers of the film only comprises microfibrillated cellulose of the first suspension, i.e. it does not comprise microfibrillated dialdehyde cellulose (DA-MFC). It may also be possible that one or more layers of the film is a water vapor barrier film comprising any one of polyethylene (PE), polypropylene (PP), polyamide, polyethylene terephthalate (PET) or ethylene vinyl alcohol (EVOH). It may also be possible that one or more layers of the film is a metallized barrier layer, comprising any one of aluminium, aluminium oxides, magnesium oxides, silicium oxides, copper, magnesium and silicon. The film may comprise two, three, four, five, six, seven, eight, nine, ten or more layers.

The substrate may also be a porous wire of a paper making machine, i.e. any kind of paper making machine known to a person skilled in the art used for making paper, paperboard, tissue or any similar products.

The substrate may also be a base material such as paper or a paperboard product to which the mixture is applied to form a coated product suitable for use as a packaging material. Such a coated product may be used as a liquid packaging board suitable for containers and packages holding a liquid content. A packaging material including a layer of the mixture according to the invention may comprise further barrier layers for preventing migration of air, water and flavors through the base material. According to one aspect a packaging material may include at least one water vapor barrier layer comprising any one of polyethylene (PE), polypropylene (PP), polyamide, polyethylene terephthalate (PET) or ethylene vinyl alcohol (EVOH). The packaging material may also include one or more metallized barrier layer(s) comprising any one of aluminium, aluminium oxide, magnesium oxide or silicium oxide.

The microfibrillated cellulose in the first suspension is microfibrillated cellulose produced from mechanical, thermomechanical or chemical pulp. The microfibrillated cellulose of the first suspension is preferably produced from kraft pulp. The microfibrillated cellulose of the first suspension preferably has a Schopper Riegler value (SR°) of more than 90. According to another embodiment the MFC may have a Schopper Riegler value (SR°) of more than 93. According to yet another embodiment the MFC may have a Schopper Riegler value (SR°) of more than 95. The Schopper-Riegler value can be obtained through the standard method defined in EN ISO 5267-1. This high SR value is determined for a pulp, with or without additional chemicals, thus the fibers have not consolidated into a film or started e.g. hornification. The dry solid content of this kind of web, before disintegrated and measuring SR, is less than 50% (w/w). To determine the Schopper Riegler value it is preferable to take a sample just after the wire section where the wet web consistency is relatively low. The skilled person understands that paper making chemicals, such as retention agents or dewatering agents, have an impact on the SR value. The SR value specified herein, is to be understood as an indication but not a limitation, to reflect the characteristics of the MFC material itself.

The microfibrillated dialdehyde cellulose in the second suspension should in this context mean a dialdehyde cellulose treated in such way that it is microfibrillated. The production of the microfibrillated dialdehyde cellulose is done by treating dialdehyde cellulose for example by a homogenizer or in any other way such that fibrillation occurs to produce microfibrillated dialdehyde cellulose. The microfibrillated dialdehyde cellulose in the second suspension preferably has an oxidation degree between 25-75%, preferably between 30-65%, even more preferably between 30-50% or most preferred between 35-45%. The degree of oxidation was determined according to the following description: after the dialdehyde cellulose reaction, the amount of C2-C3 bonds in the cellulose that are converted to dialdehydes are measured. The degree of oxidation is the amount of C2-C3 bonds that are converted compared to all C2-C3 bonds. This is measured with a method by H. Zhao and N. D. Heindel, "Determination of Degree of Substitution of Formyl Groups in Polyaldehyde Dexran by the Hydroxylamine Hydrochloride Method", Pharmaceutical Research, vol. 8, pp. 400-402, 1991, where the available aldehyde groups reacts with hydroxylamine hydrochloride. This forms oxime groups and releases hydrochloric acid. The hydrochloric acid is titrated with sodium hydroxide until pH 4 is reached, and the degree of oxidation is thereafter calculated from according to the formula below. The received aldehyde content is divided by two to get the value of the degree of oxidation, since an oxidized anhydroglucose unit has two aldehyde groups.

$$D.O[\%] = \frac{V_{NaOH} \times c_{NaOH}}{m_{sample} \times M_w} \times \frac{1}{2} \times 100$$

$V_{NaOH}$=the amount of sodium hydroxide needed to reach pH 4 (l)
$C_{NaOH}$=0.1 mol/l
$m_{sample}$=dry weight of the analysed DAC sample (g)
$M_w$=160 g/mol, which is the molecular weight of the dialdehyde cellulose unit The mixture may further comprise additives, preferably any one of a starch, carboxymethyl cellulose, a filler, retention chemicals, flocculation additives, deflocculating additives, dry strength additives, softeners, or mixtures thereof. It may be possible to add additives that will improve different properties of the mixture and/or the produced film. It may be possible to add the additive to the first suspension, the second suspension and/or to the mixture. It has been shown that the use of a softener, such as sorbitol, glycerol, polyethylene glycol, sorbic acid, propylene glycol, erythritol, maltitol or polyethylene oxides, will modify and improve some of the mechanical properties of the film, especially the stretch at break properties. The amount of sorbitol used is preferably between 1-20% by dry weight of the film.

According to one embodiment the film, comprising microfibrillated cellulose and microfibrillated dialdehyde cellulose, has an oxygen transmission rate in the range of from 0.1 to 300 cc/m²/24 h measured according to the standard ASTM D-3985, at a relative humidity of 50% at 23° C. and/or at a relative humidity of 90% at 38° C.

The amount of microfibrillated cellulose in the produced film is preferably between 5-80 wt-% by total dry weight of the film, preferably between 10-60 wt-% by total dry weight of the film and even more preferred between 10-40 wt-% by total dry weight of the film. The amount of microfibrillated dialdehyde cellulose in the produced film is preferably between 20-95 wt-% by total dry weight of the film, preferably between 40-90 wt-% by total dry weight of the film and even more preferred between 60-90 wt-% by total dry weight of the film.

According to one embodiment the film may have a basis weight of less than 50 g/m², or less than 35 g/m², or less than 25 g/m². The basis weight is preferably at least 10 g/m², preferably between 10-50 g/m², even more preferred between 10-35 g/m² and most preferred between 10-25 g/m².

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 200 m2/g, or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.
MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

In one embodiment of the present invention, the microfibrillated cellulose is fibrillated in the presence of the wet strength additive. This means that the wet strength additive is either added before the fibrillation process or during the fibrillation process.

EXAMPLES

Example I: Stability Test

The stability during storage of a suspension comprising microfibrillated dialdehyde cellulose (DA-MFC) was compared to a suspension comprising a mixture of microfibrillated cellulose and microfibrillated dialdehyde cellulose.

The suspension comprising a mixture of MFC and DA-MFC comprises 40 wt-% by total dry weight of the suspension of MFC and 60 wt-% by total dry weight of the suspension of DA-MFC. The oxidation degree of the DA-MFC were 40%.

Both suspension were stored for 15 days. The particle size distribution of the suspensions before storage is seen as "start material" since the particle size distribution for both suspension were the same. The particle size distribution was measured with Mastersizer 3000 (Malvern Instruments Ltd., UK).

Figure 1:
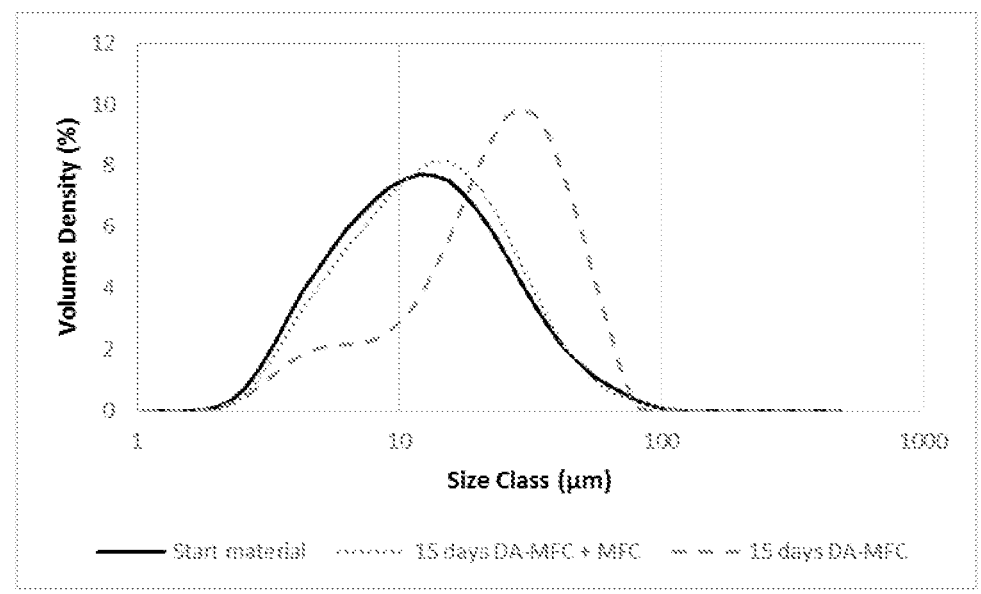
FIG. 1: describes the particle size distribution during storage for two suspensions.

The results can be seen in FIG. 1. It is evident from FIG. 1 that the suspension comprising a mixture of DA-MFC and MFC has a much more stable particle size distribution after storage compared to the suspension only comprising DA-MFC.

Example II: OTR Values after Fluctuating Humidity

The OTR value for films comprising only MFC, only DA-MFC and films comprising mixtures of MFC and DA-MFC were measured at a humidity of 90% at 38° C. at two different cycles.

Figure 2:
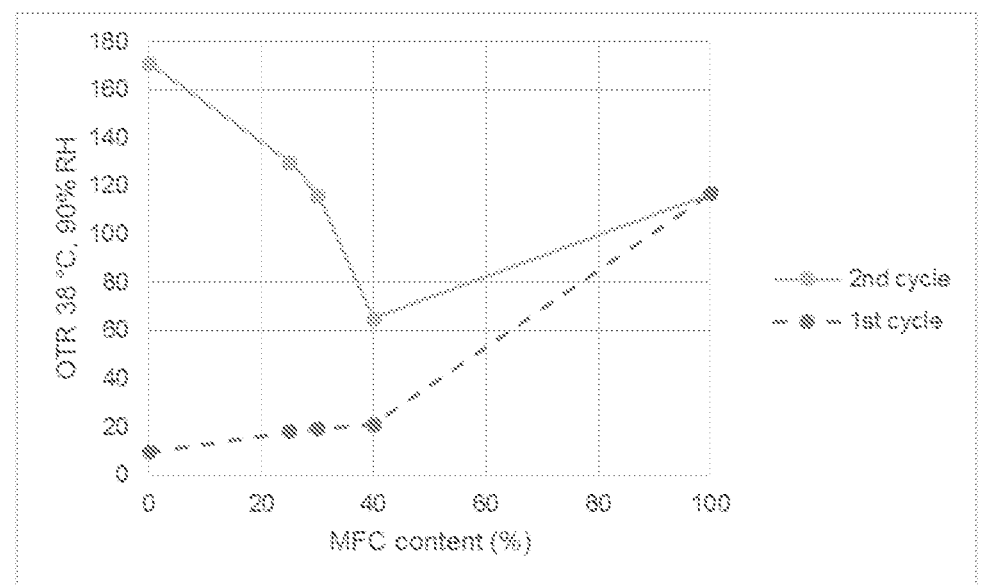
FIG. 2: describes the OTR value for films at fluctuating humidity.

The films each has a grammage of about 40 g/m$^2$ and the OTR value was measured according to standard ASTM D-3985. The oxidation degree of the DA-MFC used was 38%. The films were stored at room temperature and then the OTR value was measured at a high humidity of 90% at 38° C. and this represents the OTR value in the 1$^{st}$ cycle. The films were thereafter stored at room temperature again and the OTR value was once again measured at a high humidity of 90% at 38° C. and this represents the OTR value in the 2$^{nd}$ cycle The results can be seen in FIG. 2. It is shown in FIG. 2 that the OTR values for the films comprising a mixture of MFC and DA-MFC has a better OTR value (low value is good) in the 2$^{nd}$ cycle compared to the film comprising only DA-MFC and also to the film comprising only MFC.

Example III: Strain at Break for DA-MFC Films

DA-MFC with an average D.O. of 30% was mixed with native MFC, with a mass ratio of 80%/20%. The solids content of the dispersion was 3 wt %. The mixture was cast coated on a plastic substrate. After drying in room temperature, the film thickness was 58 µm. Film samples were laminated to PE film with a grammage of 25 g/m$^2$.

The strain at break was measured by means of a standard tensile test (ISO 1924-2 with a span length of 20 mm), wherein the film to be tested was stretched with test speed of 2 mm/minute until a point where it ruptured. The strain at break then corresponds to the percent elongation when rupturing, i.e. to what extent in % the film deforms without breaking upon being subjected to stretching.

The results are seen in Table 1 below and shows that application of a PE layer onto a film comprising DA-MFC leads to improved strain at break.

TABLE 1

| Material tested | Strain at break (%) |
|---|---|
| DA-MFC film | 1.0 |
| DA-MFC film + PE layer | 1.2 |

Example IV: Barrier Properties of DA-MFC Films and Laminates

DA-MFC with an average D.O. of 30% was mixed with native MFC, with a mass ratio of 80%/20%. The solids content of the dispersion was 3 wt %. The mixture was cast coated on a plastic substrate. After drying in room temperature, the film thickness was 58 µm. This film is referred to as "DA-MFC film". Films were also made with 100% native MFC as a comparison, referred to as "MFC film". The adhesion of the native MFC film to the substrate was too low for successful casting. To solve this problem, 15 wt % of sorbitol was added to the films. The addition of sorbitol is noted with (s) in Table 2 and the figures.

Film samples were laminated to PE film with a grammage of 25 g/m$^2$, and other film samples were laminated to board with a grammage of 239 g/m$^2$ and PE to form an LPB structure. Said LPB structure was: (15+board+15+film+50) where the numbers are the grammage of the PE layers in g/m$^2$. The results were compared to a commercial board grade with a grammage of 265 g/m$^2$, with PE layers on both sides. The grammage of the PE layers was 14 g/m$^2$ on the top side and 24 g/m$^2$ on the bottom side.

The OTR was measured according to ASTM F-1927, at the following climates: 23° C., 50% RH; 23° C., 80% RH; and 38° C., 90% RH. The WVTR was measured according to ASTM F-1249, at the following climates: 23° C., 50% RH; 23° C., 80% RH; and 38° C., 90% RH. For the two higher climates, the laminates were stored in the measuring climate for 2 weeks before measurement, to ensure that moisture equilibrium was attained in the sample during the measurement. This was not needed for the films without PE.

Figure 3:
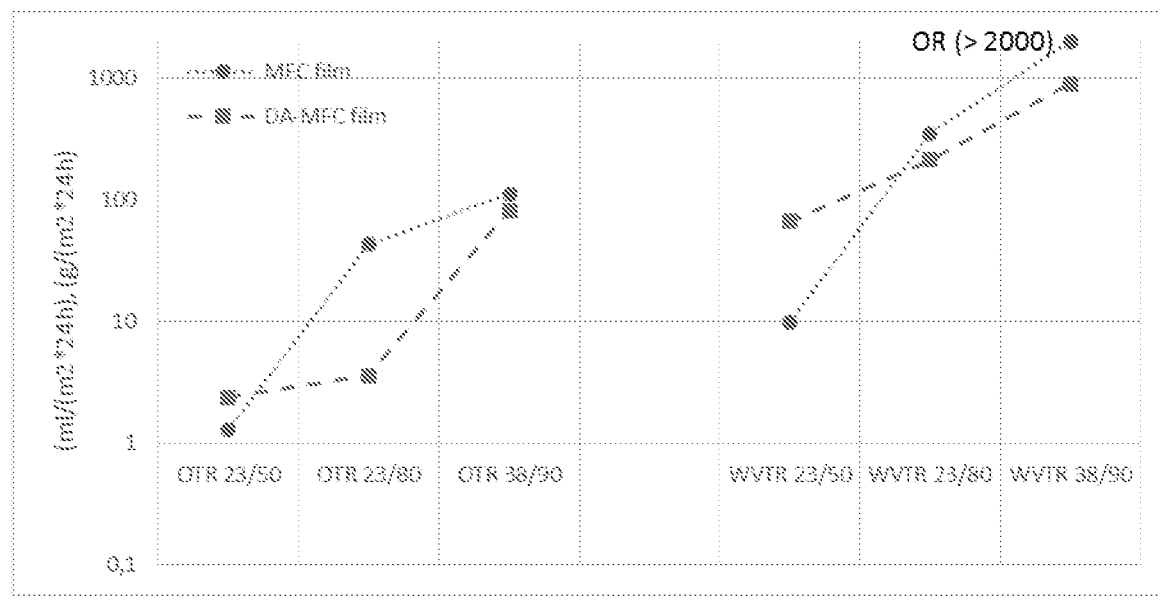
FIG. 3: shows barrier properties in the form of OTR and WVTR respectively for free-standing films.
Figure 4:
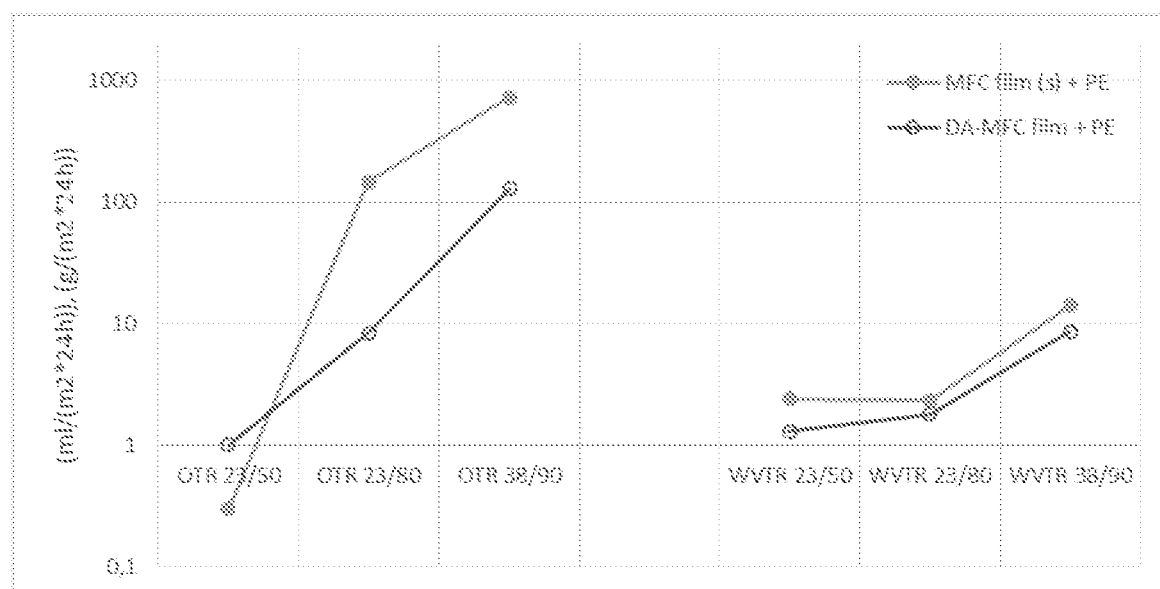
FIG. 4: shows barrier properties in the form of OTR and WVTR respectively for PE coated films.
Figure 5:
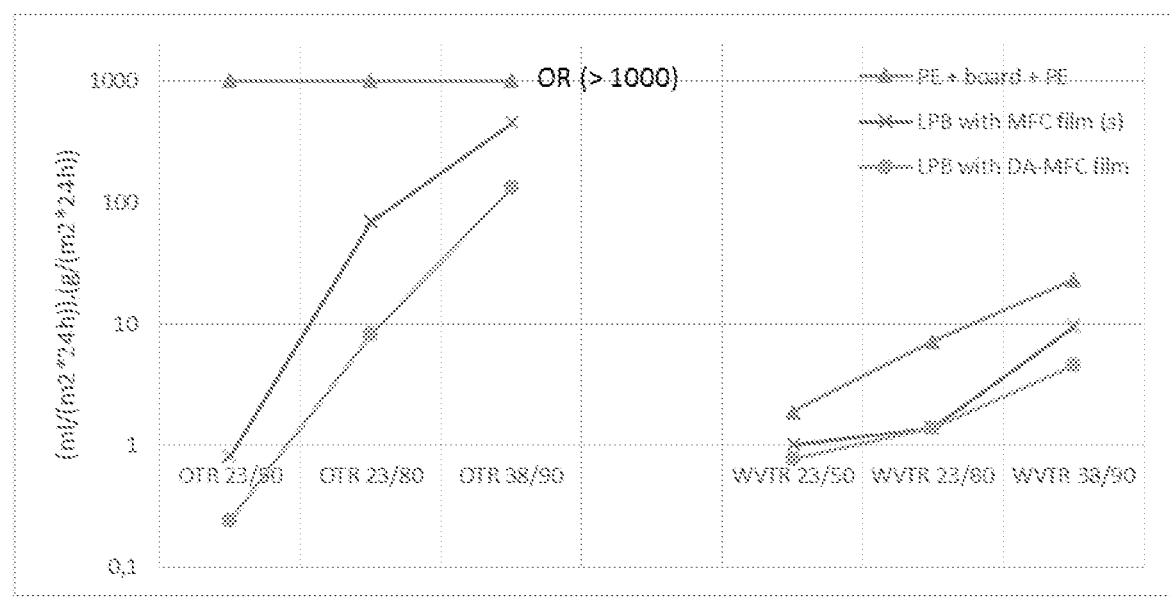
FIG. 5: shows barrier properties in the form of OTR and WVTR respectively of LPB structures

The results are seen in Table 2 and in FIGS. 3-5. Herein can be seen that the DA-MFC film has a lower OTR at high humidity (i.e. 80% and 90% RH respectively) compared to native MFC film.

TABLE 2

Barrier properties of DA-MFC films and laminates (— = not measured).

| | OTR 23/50 | OTR 23/80 | OTR 38/90 | WVTR 23/50 | WVTR 23/80 | WVTR 38/90 |
|---|---|---|---|---|---|---|
| MFC film | 1.3 | 43 | 112 | 9.8 | 351 | >2000 |
| DA-MFC film | 2.4 | 3.6 | 82 | 67 | 214 | 900 |
| MFC film (s) + PE | 0.3 | 146 | 720 | 2.4 | 2.3 | 14 |
| DA-MFC film + PE | 1.0 | 8.3 | 128 | 1.3 | 1.8 | 8.6 |
| PE + board + PE | >1000 | >1000 | — | 1.9 | 7.2 | 23 |
| LPB with MFC film (s) | 0.8 | 69 | 447 | 1 | 1.4 | 9.5 |
| LPB with DA-MFC film | 0.24 | 8.2 | 134 | 0.77 | 1.4 | 4.6 |

The results of Example IV shows that DA-MFC film had a better oxygen barrier than native MFC film, especially at 23 C, 80% RH (FIG. 1; Table 2). Further, DA-MFC film had a slight water vapor barrier, even at high relative humidity where native MFC failed to give a water vapor barrier. WVTR of native MFC film was overrange at 38° C., 90% RH. At low relative humidity the native MFC had a better water vapor barrier (FIG. 3; Table 2).

Insertion of DA-MFC film instead of native MFC film with sorbitol in a packaging material gave better oxygen barrier function at high relative humidity (FIG. 4-5). The level of WVTR in the structure was largely controlled by the amount of PE in the structure, but the LPB with DA-MFC film was better than the one with MFC film at 38° C., 90% RH (Table 2).

It is thus possible to tailor-make packaging materials including DA-MFC films, according to the need of barrier properties Example V: OTR of Metallized DA-MFC Films and Laminates DA-MFC with an average D.O. of 30% was mixed with native MFC, with a mass ratio of 80%/20%. The solids content of the dispersion was 3 wt %. The mixture was cast coated on a plastic substrate. After drying in room temperature, the film thickness was 58 µm. This film is referred to as "DA-MFC film". Films were also made with 100% native MFC as a comparison, referred to as "MFC film". The adhesion of the native MFC film to the substrate was too low for successful casting. To solve this problem, 15 wt % of sorbitol was added to the films. The addition of sorbitol is noted with "(s)" in Table 3.

The films were metallized with Physical Vapour Deposition technology, performed in a vacuum chamber. Aluminum was vaporized by heat, and when it had reached the film it condensated on top of it. The thickness of the Al layer was about 30-40 nm (100 mg/m2).

TABLE 3

|  | OTR 23/80 | OTR 38/90 |
|---|---|---|
| Metallized MFC film (s) | 74 | 316 |
| Metallized DA-MFC film | 6.1 | 48 |
| LPB with metallized MFC film (s) | 13.5 | 343 |
| LPB with metallized DA-MFC film | 4.0 | 141 |

As can be seen from Table 3, the metallized DA-MFC film proves to be a very efficient oxygen barrier compared to the metallized MFC film both at 23/80 (i.e. 23° C. and 80% RH) and 38/90. Also the laminate comprising LPB with metallized DA-MFC film has a significantly lower OTR compared to the LPB with metallized MFC film.

In view of the above detailed description of the present invention, other modifications and variations will become apparent to those skilled in the art. However, it should be apparent that such other modifications and variations may be effected without departing from the spirit and scope of the invention.

The invention claimed is:

1. A film comprising microfibrillated cellulose wherein the film has an oxygen transmission rate in the range of from 0.1 to 300 cc/m$^2$/24h measured according to ASTM D-3985, at a relative humidity of 50% at 23° C. and/or at a relative humidity of 90% at 38° C., and wherein at least one layer of the film comprises a mixture of microfibrillated cellulose and microfibrillated dialdehyde cellulose.

2. The film as claimed in claim 1, wherein the film has a basis weight of less than 50 g/m$^2$.

3. The film as claimed in claim 1, wherein said film is a multilayer film comprising more than one layer.

4. The film as claimed in claim 1, wherein said film is a multilayer film and wherein at least one layer of the film is a water vapor barrier film comprising any one of polyethylene (PE), polypropylene (PP), polyamide, polyethylene terephthalate (PET) or ethylene vinyl alcohol (EVOH).

5. The film according to claim 4, wherein the water vapor barrier film has a grammage between 10-60 g/m$^2$.

6. The film according to claim 1, wherein said film is a multilayer film and wherein at least one layer of the film is a metallized barrier layer.

7. The film according to claim 6, wherein said metallized barrier layer is a physical vapour deposited metal or metal oxide layer, or a chemical vapour deposited metal or metal oxide layer.

8. The film according to claim 7, wherein said metal or metal oxide is selected from the group consisting of aluminium, aluminium oxides, magnesium oxides, silicium oxides, copper, magnesium and silicon.

9. The film according to claim 6, wherein said metallized barrier layer has a weight between 50-250 mg/m$^2$.

10. A packaging material comprising a base material and at least one layer of the film as claimed in claim 1.

11. The packaging material according to claim 10, wherein the base material is paper or paperboard.

12. The packaging material according to claim 11, wherein the paper or paperboard has a grammage between 20-500 g/m$^2$.

13. The packaging material according to claim 11, wherein the paper or paperboard has a grammage between 80-400 g/m$^2$.

14. The film as claimed in claim 1, wherein the film has a basis weight of between 10-50 g/m$^2$.

15. The film according to claim 4, wherein the water vapor barrier film has a grammage between 30-50 g/m$^2$.

16. The film according to claim 6, wherein said metallized barrier layer has a weight between 75-150 mg/m$^2$.

* * * * *